United States Patent
Jordan (10) Patent No.: US 9,109,815 B2
(45) Date of Patent: Aug. 18, 2015

(54) SOLAR PANEL POSITIONING ASSEMBLY

(71) Applicant: Travis Jordan, Ronan, MT (US)

(72) Inventor: Travis Jordan, Ronan, MT (US)

( * ) Notice: Subject to any disclaimer, the term of this patent is extended or adjusted under 35 U.S.C. 154(b) by 0 days.

(21) Appl. No.: 14/252,608

(22) Filed: Apr. 14, 2014

(65) Prior Publication Data

US 2014/0305489 A1    Oct. 16, 2014

Related U.S. Application Data (60) Provisional application No. 61/811,537, filed on Apr. 12, 2013.

(51) Int. Cl.
*F24J 2/54* (2006.01)
*F24J 2/38* (2014.01)
*H01L 31/042* (2014.01)

(52) U.S. Cl.
CPC .. *F24J 2/542* (2013.01); *F24J 2/38* (2013.01); *F24J 2/541* (2013.01); *H02S 20/00* (2013.01); *F24J 2002/5441* (2013.01); *Y02E 10/47* (2013.01); *Y02E 10/50* (2013.01)

(58) Field of Classification Search
CPC .............. H01L 31/0547; H01L 31/052; H01L 31/0522; F24J 2/38; F24J 2/541; F24J 2/523; F24J 2/5417; F24J 2/542; F24J 2/5424; F24J 2/5427

USPC .......................................................... 136/246
See application file for complete search history.

(56) References Cited

U.S. PATENT DOCUMENTS

| | | | | |
|---|---|---|---|---|
| 4,159,710 | A * | 7/1979 | Prast ............................. | 126/582 |
| 4,306,541 | A * | 12/1981 | Morrison et al. ............. | 126/580 |
| 5,929,530 | A | 7/1999 | Stone | |
| 2005/0034752 | A1* | 2/2005 | Gross et al. ................... | 136/246 |
| 2010/0059045 | A1 | 3/2010 | Diaz et al. | |
| 2012/0211001 | A1 | 8/2012 | Elshafei | |
| 2012/0227729 | A1 | 9/2012 | Lundahl et al. | |
| 2012/0266938 | A1 | 10/2012 | Goei et al. | |
| 2012/0285509 | A1* | 11/2012 | Surganov ...................... | 136/246 |

* cited by examiner

*Primary Examiner* — Jayne Mershon
(74) *Attorney, Agent, or Firm* — Robert L. Shaver; Shaver & Swanson, LLP (57) ABSTRACT

A solar panel positioning assembly having at least one fluid filled tank that is connected to at least one piston. The fluid filled tank is shaded by a solar panel when the panel is perpendicular to the sun. When the panel is not perpendicular to the sun, the fluid filled tank is heated by the sun, causing the fluid to expand and increase pressure in the piston. As the pressure increases the piston moves the solar array until the solar panel is perpendicular to the sun.

14 Claims, 5 Drawing Sheets

SOLAR PANEL POSITIONING ASSEMBLY

PRIORITY/CROSS-REFERENCE TO RELATED APPLICATIONS

This application claims the benefit of U.S. Provisional Application No. 61/811,537, filed Apr. 12, 2013, the disclosure of which is incorporated by reference.

TECHNICAL FIELD

The presently disclosed and claimed inventive concepts generally relate to an apparatus for collecting solar power, and more particularly to an apparatus for optimally positioning a solar power collector automatically.

BACKGROUND

The generation of electricity from solar energy is not a new concept. However, since its discovery the use of solar energy to create electricity has been difficult to make economically feasible. This has been due to the large cost of equipment as well as the low efficiency of the equipment. These problems are compounded by the relatively low cost of the production of electricity from burning oil and gas, as well as hydro-electric power generation using dams.

Many solar power collectors are large flat panels capable of creating electricity directly from absorbed sunlight. Users often mount solar panels on roofs or other fixed positions where the solar panels are exposed to the sun. Unfortunately solar panels operate with greatest efficiency when oriented perpendicularly to the sun. As the sun crosses the sky the panels only operate at peak efficiency for a limited amount of time.

To combat the efficiency issues, solar power systems have been created that allow the solar panels to rotate as the sun crosses the sky. With these systems the panels are always pointed directly at the sun and can achieve maximum efficiency. These systems, however, often include expensive hydraulic-systems requiring pumps as well as computer systems, complex algorithms and electric power in order to maintain their orientation with the sun. The costs associated with these systems increases the initial investment required to build and install the solar panel arrays, increasing the cost per watt generated.

The automatic solar array orienting systems, while increasing efficiency, result in an excessive cost increase. In order to make solar power collection more feasible, it is necessary to reduce costs while maintaining efficiency by lowering the initial cost of the equipment and thus improving the cost per watt of electricity, and eliminating the need to provide electricity to the site.

SUMMARY OF THE DISCLOSURE

The purpose of the Abstract is to enable the public, and especially the scientists, engineers, and practitioners in the art who are not familiar with patent or legal terms or phraseology, to determine quickly from a cursory inspection, the nature and essence of the technical disclosure of the application. The Abstract is neither intended to define the inventive concepts of the application, which is measured by the claims, nor is it intended to be limiting as to the scope of the inventive concepts in any way.

Disclosed is a solar panel positioning assembly capable of automatically adjusting the orientation of a solar panel array without the use of outside electrical power, computers or electrical circuits. Instead the solar panel positioning assembly uses at least one fluid filled tank coupled with at least one piston to cause movement of the solar panel array.

The solar panel positioning assembly has a vertical support member, such as a pole, and a frame with a central mount capable of rotating on the vertical support member. The frame has at least one cross-member attached to the central housing mount, and capable of rotation.

Included is a solar array, which is made up of one or more solar panels, each with four sides forming a periphery, and a sun facing side and a shade facing side. The fluid filled tank or tanks, is/are preferably attached on the shade facing side of the panel, near the periphery, or outside edge, of the solar array so that the fluid filled tank is shaded from the sun by the solar panel when the solar panel is at angle perpendicular to the incoming sunlight. As the sun travels across the sky, the fluid filled tank will become exposed to the solar energy causing the fluid inside the tank to heat and increase in pressure. This pressure increase is transferred to an attached piston, which transfers the fluid pressure into a pressure causing movement of the piston. The piston utilizes a cylindrical body and a central rod. The central rod operates to extend away from or in to the cylindrical housing to move the array. If two solar panels are used, the vertical support member can be located between the two panels in a separation space. Further, the fluid filled tanks can be positioned under the inner edges of the solar panel on either or both sides of the separation space. As an alternative, if a single panel is used, a tank can be mounted on a single side or multiple tanks can be mounted on separate sides.

The tanks and pistons can be arranged so that two tanks are attached to a single piston. This configuration utilizes a separation disk within the cylindrical body to form two separate chambers. The central rod is attached to the separation disk so that an end of the rod extends beyond one end of the cylindrical body. Each chamber is connected to a fluid filled tank. The end of the central rod, and the opposite end of the cylindrical body, is attached to the frame and the vertical support, respectively. In this configuration the fluid filled tanks operate to push the separation disk and move the central rod. This can use further use multiple pistons attached to multiple fluid filled tanks. Alternatively, each fluid filled tank can be attached to an individual piston. In this configuration the pistons are positioned so that as one extends, it necessarily causes the other to contract. In this way, as one fluid filled tank heats, it will cause compression of the opposing piston to allow the heating tank to become shaded.

An additional axis of movement can be obtained through the use of additional tank and piston configurations. For example, two fluid filled tanks can be mounted on adjacent sides of the solar panel and connected to separate pistons to orient the solar array on two separate axes. Alternatively, four fluid filled tanks can be attached to four different sides of the solar array. In this configuration a first fluid filled tank is mounted near an edge with a second fluid filled tank mounted on an opposite edge, a third fluid filled tank is mounted on an adjacent edge, and a fourth fluid filled tank is mounted on an edge opposite of the third fluid filled tank. Each fluid filled tank can be attached to an individual piston, or two fluid filled tanks can be attached to a single piston, allowing for movement around two separate axis.

Still other features and advantages of the presently disclosed and claimed inventive concepts will become readily apparent to those skilled in this art from the following detailed description describing preferred embodiments of the inventive concepts, simply by way of illustration of the best mode contemplated by carrying out the inventive concepts. As will be realized, the inventive concepts are capable of modification in various obvious respects all without departing from the inventive concepts. Accordingly, the drawings and description of the preferred embodiments are to be regarded as illustrative in nature, and not as restrictive in nature.

DETAILED DESCRIPTION OF THE EXEMPLARY EMBODIMENTS

While the presently disclosed inventive concepts is susceptible of various modifications and alternative constructions, certain illustrated embodiments thereof have been shown in the drawings and will be described below in detail. It should be understood, however, that there is no intention to limit the inventive concepts to the specific form disclosed, but, on the contrary, the presently disclosed and claimed inventive concepts is to cover all modifications, alternative constructions, and equivalents falling within the spirit and scope of the inventive concepts as defined in the claims.

Figure 1:
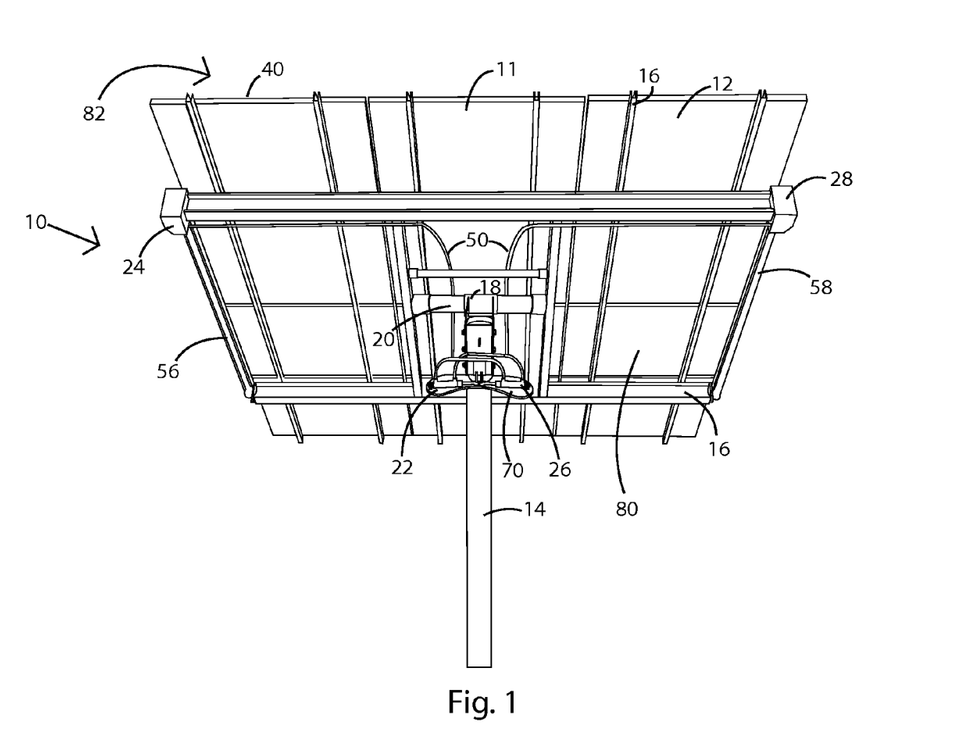
FIG. 1 is a rear bottom view of a solar array tracking device capable of movement in a single axis in accordance with an embodiment of the inventive concepts.

A device for automatically positioning a solar array so that the solar array is normal to the sun is provided. While certain modifications and alternatives are provided below, other alternatives are envisioned. FIG. 1 shows a solar panel positioning assembly 10 attached to the ground using vertical support member 14. Vertical support member 14 can be various shapes in cross section, such as rectangular or oval but a circular pole cross section tube is preferred and shown in FIG. 1. The vertical support member 14 could be a pole 3' to 30' or more in height as well as different materials, such as steel. It is necessary to choose a size, shape, and material so that the pole is sufficiently strong and tall to support a solar panel while allowing some movement of the solar array, as detailed below. The height and width of the vertical support member 14 would thus be adjusted to the particular installation. Attached to vertical support member 14 is frame 16. Frame 16 is comprised of central housing mount 18 and cross-member 20. Central housing mount 18 is attached to vertical support member 14 and cross-member 20 is attached to central housing mount 18. These parts could be various dimensions and materials, but typical dimensions and materials would be a frame of 2" steel tubing 72" long, central housing mount of 4" steel tubing, 24" long, and a cross-member of 2" steel tubing, 24" long.

Figure 7:
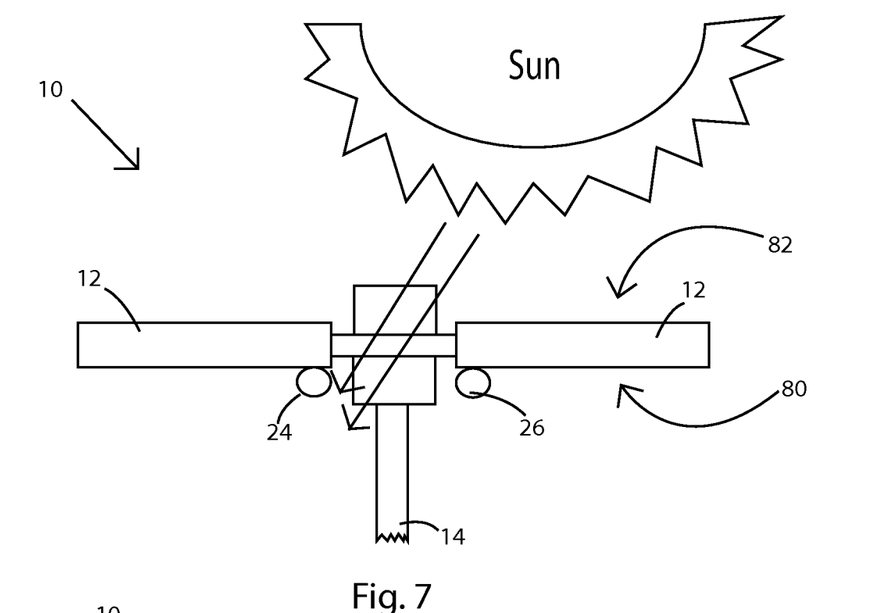
FIG. 7 is a perspective view of a solar array in accordance with an embodiment of the inventive concepts.

On top of cross-member 20 is then placed solar array 11, made up of one or more solar panels 12, which can be of various sizing, such as 10'×10', 8'×15' or other sizes depending on the desired attributes. Each solar panel 12 has a periphery 40 consisting of the exterior sides of the solar panel. FIG. 1 shows an embodiment of the inventive concepts where solar panels 12 are attached to vertical support member 14 to create a continuous solar collecting surface. Shown in FIG. 1 is the shade facing side 80 of the solar panels 12. The side opposite the shade facing side 80 is the sun facing side 82. In this embodiment the solar panels 12 cover vertical support member 14 along with frame 16. First fluid filled tank 24 and second fluid filled tank 28 are positioned on opposite sides of the periphery 40. FIG. 7 shows solar panel positioning assembly 10 having two solar panels 12 with vertical support member 14 between the solar panels 12 within a separation space 42 defined by the inner edge 44 of each solar panel. A separation space of 18" would be an example of one installation.

In one embodiment the cross-member 20 is rotatably mounted to central housing 18. This can rotate around a post or bolt or other conventional rotation devices. This allows the cross-member and solar panel to rotate as the sun passes from one side of the solar array to the other. Additionally, central housing mount 18 can be further rotatable in order to allow rotation on an axis perpendicular to the axis of rotation discussed above, allowing the solar panels 12 to change angle in relation to the sun.

Figure 2:
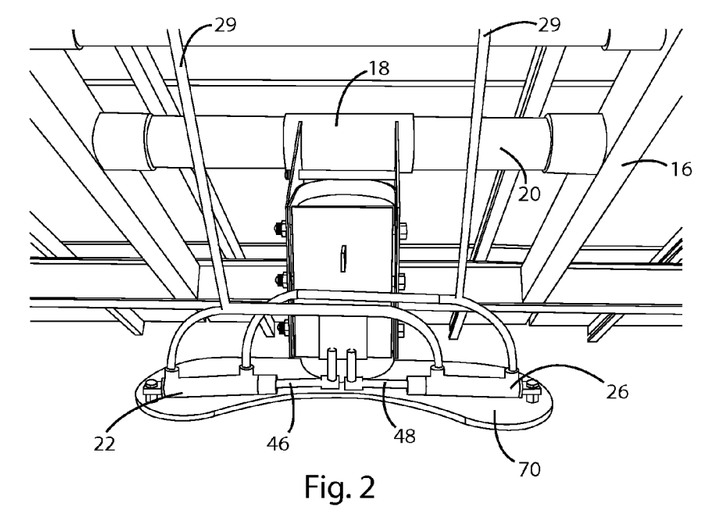
FIG. 2 is a rear bottom close-up view of a mechanism for moving a solar array in accordance with an embodiment of the inventive concepts.

FIG. 2 is a magnified view of the rotational mechanism shown in FIG. 1. Shown in FIG. 2 is a first movement piston 22 and a second movement piston 26. The fluid filled tanks are each in fluid connection with both the pistons through connection line 29. The fluid from one tank exerts a pushing force on one side of one piston, and a pulling force on one side of the other piston. This difference in fluid pressure causes the piston inside the housing to move one way or the other. With one end of each piston attached to the solar array, and one end attached to the piston mount 70, vertical support member, or other fixed mount, movement of the pistons results in movement of the solar array.

Figure 3:
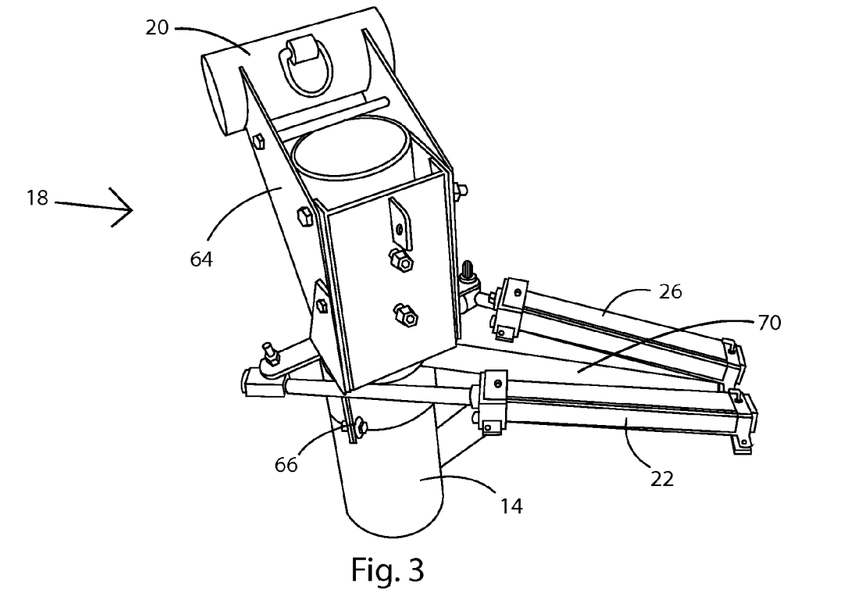
FIG. 3 is a perspective view of a solar array mounting bracket having one of the two pistons extended and the second of the two pistons retracted in accordance with an embodiment of the inventive concepts.
Figure 4:
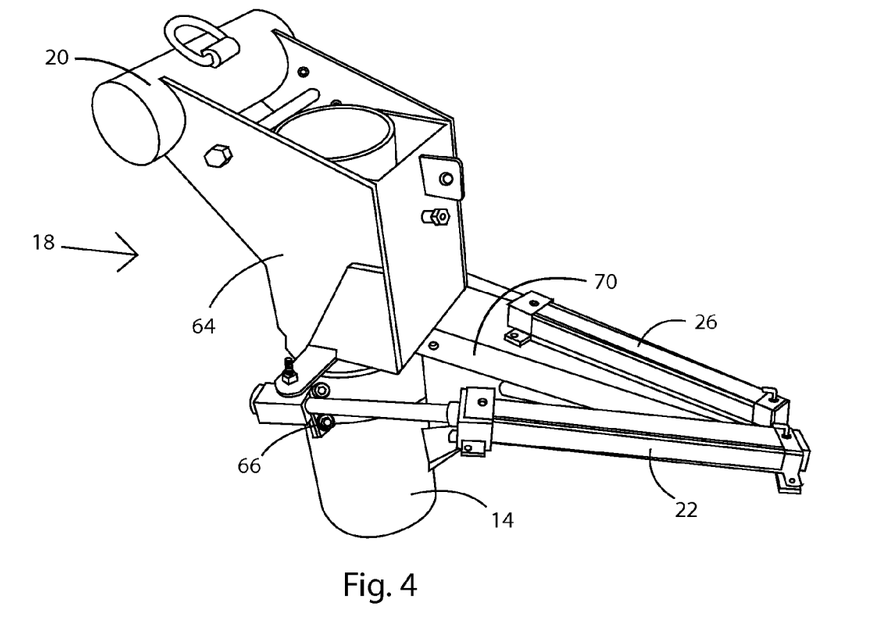
FIG. 4 is a perspective view of a solar array mounting bracket having two pistons equally extended in accordance with an embodiment of the inventive concepts.

In a second preferred embodiment, shown in FIGS. 3-4, central housing mount 18 can be made of a rotating housing 64 rotatably attached to fixed housing 66. In this configuration the cross-member 20 is attached to rotating housing 64 and fixed housing 66 is connected to the vertical support member 14. Solar array 11 would be attached to the cross-member 20. First movement piston 22 and second movement piston 26 are attached to the rotating housing at one end, and to fixed mount, such as piston mount 70 in FIG. 1, at the other end. FIG. 3 and FIG. 4 show the rotating housing 64 moved to different positions by action of the pistons 22 and 26.

Figure 5:
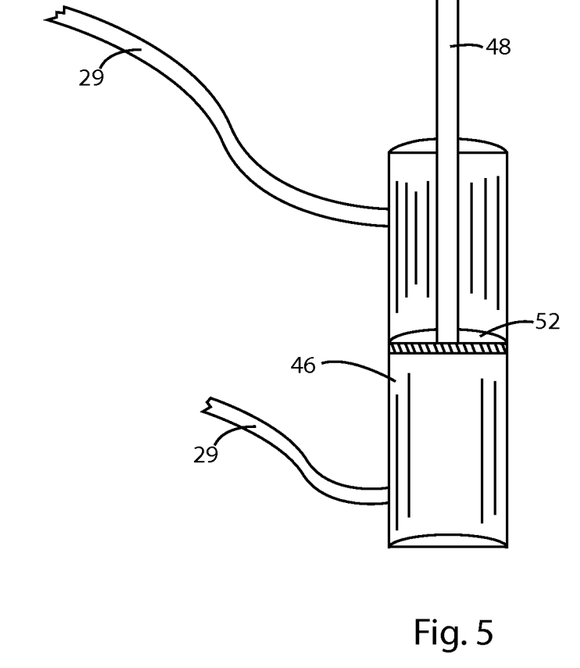
FIG. 5 is a cutaway view of a piston in accordance with an embodiment of the inventive concepts.

FIG. 5 shows a first movement piston 46 in accordance with an embodiment of the inventive concepts. The piston shown has a cylindrical body 46 surrounding a separation disk 52. On each end of cylindrical body 46 is connector 29 for connection to a fluid filled tank. Each of connectors 29 is attached to a separate fluid filled tank. As the pressure in one fluid filled tank changes, separation disk 52 will move due to the pressure differential across the separation disk 52. On one side of separation disk 52 is a central rod 48. Central rod 48 attaches to the vertical support member and cylindrical body 46 attaches to a solar panel. As the pressure changes in the attached fluid filled tanks, the separation disk 52 moves due to a pressure differential. This movement causes central rod 48 to extend out of or retract into the cylindrical body 46, causing the solar panel to adjust until the pressure gradient is sufficiently reduced. The pressure differential is caused when one fluid filled tank is in the sun, and one is in the shade. The pressure differential becomes zero when both tanks are in the shade, which occurs when the solar array 11 moves sufficiently to shade both tanks.

Figure 6:
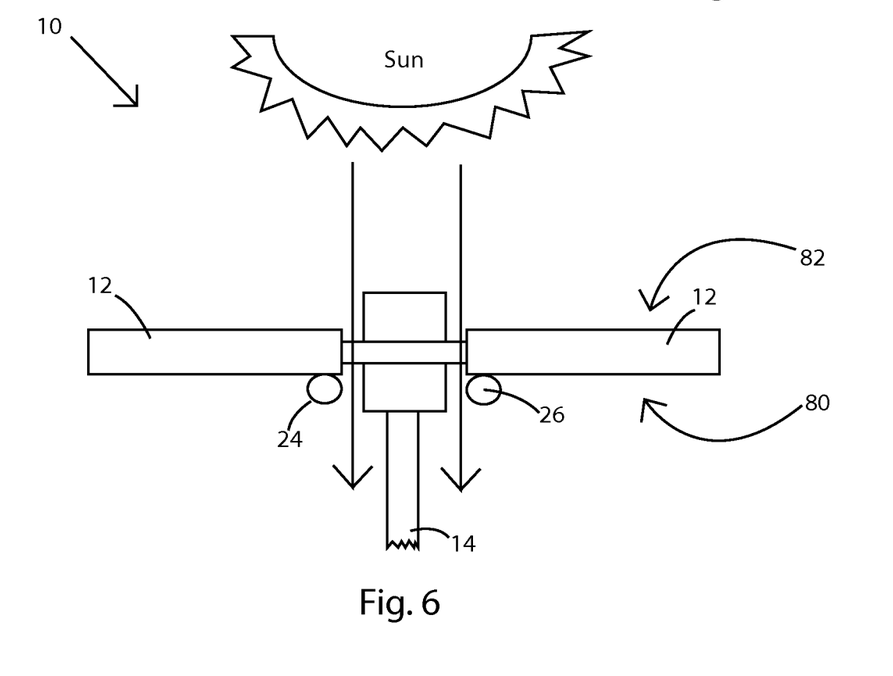
FIG. 6 is a perspective view of a piston in accordance with an embodiment of the inventive concepts.

FIG. 6 shows first fluid filled tank 24 mounted underneath the solar panel 12. Fluid filled tank 24 is in fluid communication with first movement piston 22, although that connection is not shown in FIG. 6. In FIG. 6 fluid filled tanks 24 and 26 are shaded by solar panels. FIG. 7 shows the solar array positioner 10 as the sun has moved a bit, and one tank is in the shade and one tank is in the sun. As the sun passes across the sky, first fluid filled tank 24 will be exposed to sunlight causing the fluid inside to heat. As the tank heats, the fluid inside will increase in pressure, resulting in a force being exerted on first movement piston 22. This heating of the first fluid tank 24 and subsequent activation of first movement piston 22 is done automatically and without the input of a computer or electricity or the use of electronic circuits. Together the second fluid filled tank and second movement piston operate in a similar fashion as the first fluid filled tank and first movement piston in that when the second fluid filled tank is exposed to sunlight the pressure inside the tank increases and causes the pistons to extend.

These piston and tank structures work to keep the solar array positioned in a direction perpendicular to the incoming sunlight. While two pistons and two tanks are shown, it should be noted that two tanks and one piston is possible where each fluid filled tank is attached to the opposite end of the piston and the piston has a central mount which is attached to the central housing. In this system the piston is kept at equilibrium by the changing pressures in either of the fluid filled tanks.

Figure 8:
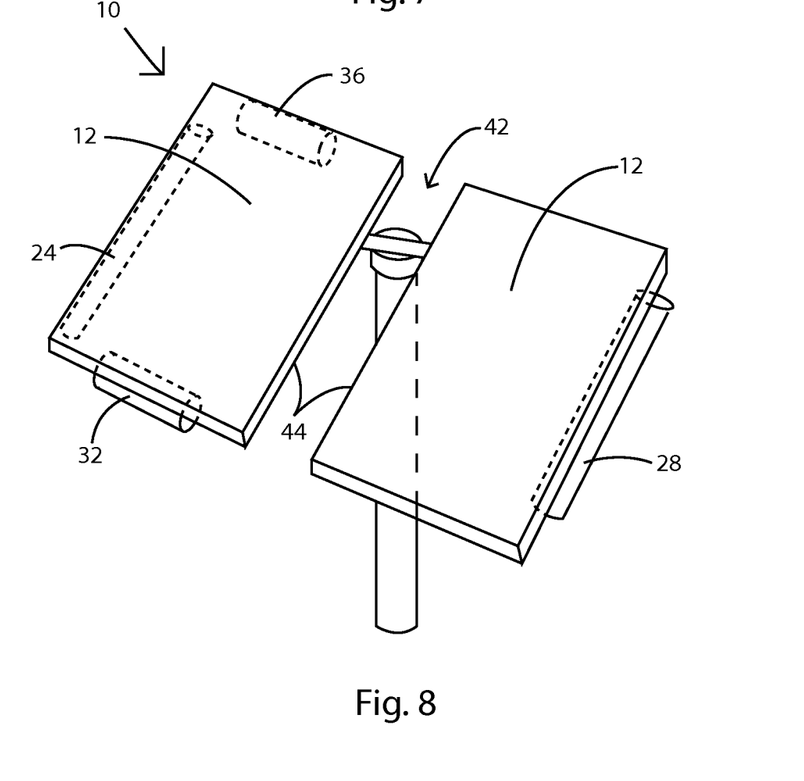
FIG. 8 is a perspective view of a solar array tracking device capable of movement in 2 axes in accordance with an embodiment of the inventive concepts.

FIG. 8 shows another preferred embodiment. In this embodiment the first fluid filled tank 24 and second fluid filled tank 28 and first movement piston 22 and second movement piston 26 of the first embodiment are still present to facilitate rotation about a vertical axis and a third fluid filled tank 32 and fourth fluid filled tank 36 and corresponding pistons are provided. In this embodiment, first fluid filled tank 24 and second fluid filled tank 28 are mounted on edges opposed of the inner edge 44 and separation space 42. The third and fourth fluid filled tanks are positioned at opposite ends of the solar panel, i.e. the third fluid filled tank is attached near a top or bottom edge of solar panels 12 and the fourth fluid filled tank is attached near a bottom edge of solar panels 12. The sides on which the third fluid filled tank 32 and fourth fluid filled tank 36 are positioned are preferably perpendicular to the sides of solar panel where the first 24 and second 28 fluid filled tanks are located. The pistons associated with the third and fourth tanks are connected at one end to a rotating structure, and at the other end to a stationary structure. Third piston 30 and fourth piston 34 and fluid filled tanks should be configured so that when the solar array is normal to the incoming solar energy both fluid filled tanks are shaded by the solar panel. As the sun moves and warms fluid filled tanks are exposed, the fluid inside that tank will increase in pressure causing operation of the attached piston. The operation of the piston will cause the solar array to rotate to shade the exposed fluid filled tank. While a dual piston and dual fluid filled tank configuration is shown, other configurations are possible; for example, one could have two fluid filled tanks connected to a single piston where the fluid filled tanks operate to oppose each other in the piston and a center piece on the piston moves as the pressure between the two fluid filled tanks changes.

Figure 9:
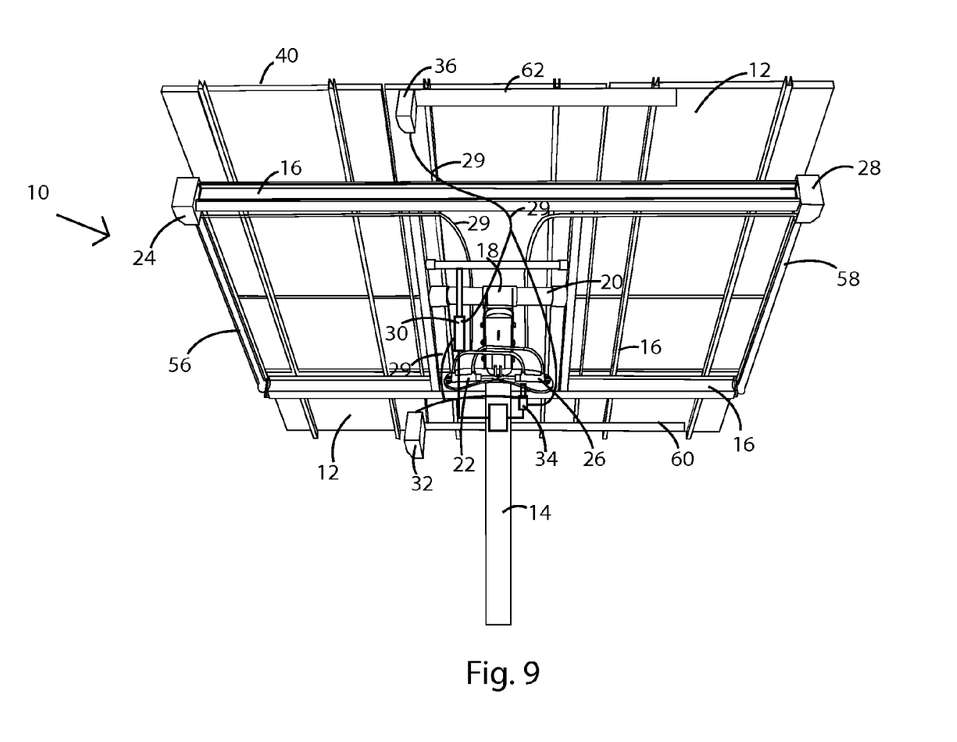
FIG. 9 is a rear bottom view of a solar array tracking device capable of movement in 2 axes in accordance with an embodiment of the inventive concepts.

FIG. 9 shows a mechanism for rotating the solar panels 12 about both a vertical and a horizontal axis. In this embodiment the first fluid filled tank 24 and second fluid filled tank 28 and first vacuum tube 56 and second vacuum tube 58 and first movement piston 22 and second movement piston 26 of the first embodiment are still present to facilitate rotation about a vertical axis and a third fluid filled tank 32 and fourth fluid filled tank 36 and corresponding pistons are provided. Third piston 30 is connected to vertical support member 14, although attachment to a different rigid structure is acceptable, and to frame 16 at a location vertically separated from cross-member 20. Fourth piston 34 is connected to vertical support member 14 and to frame 16 at a location vertically separated from cross-member 20 and opposite of the connection between third piston 30 and vertical support member 14. In this manner extension of fourth piston 34 will cause rotation about a horizontal axis while causing retraction of third piston 30. The third and fourth fluid filled tanks are positioned at opposite ends of the solar panel, i.e. the third fluid filled tank is attached near a top edge of solar panels 12 and the fourth fluid filled tank is attached near a bottom edge of solar panels 12. The sides on which the third fluid filled tank 32 and fourth fluid filled tank 36 are positioned are preferably perpendicular to the sides of solar panel where the first 24 and second 28 fluid filled tanks are located. Additionally third vacuum tube 60 is attached to third fluid filled tank 32 and fourth vacuum tube 62 is attached to fourth fluid filled tank 36. The vacuum tubes collect solar energy and transfer it to the attached fluid filled tank. In an alternative embodiment the vacuum tubes are removed and the fluid filled tanks are extended in place of the vacuum tubes. The fluid filled tanks are connected to the associated pistons using fluid connectors 29.

While certain exemplary embodiments are shown in the figures and described in this disclosure, it is to be distinctly understood that the presently disclosed inventive concept(s) is not limited thereto but may be variously embodied to practice within the scope of the following claims. From the foregoing description, it will be apparent that various changes may be made without departing from the spirit and scope of the disclosure as defined by the following claims.

I claim:

1. A solar panel positioning assembly comprising:
a vertical support member configured for support of a solar array;
a frame, having a central housing mount capable of attachment to said support member, said frame having at least one cross-member rotatably attached to said central housing mount;
a solar array formed by least one solar panel attached to said frame for collection of solar energy, with said at least one solar panel having a periphery of four sides of each solar panel, said solar panel with a sun facing side and a shade facing side;
a first and a second fluid filled tank positioned adjacent to two sides of said periphery of said solar panels, on said shade facing side of said solar panels and configured so that said first and second fluid fill tanks are simultaneously shaded by said solar array when said solar array is normal to the sun with said sun facing sides of said solar panels facing said sun, with said first fluid filled tank operationally connected to a first movement piston and said second fluid filled tank operationally connected to a second movement piston;

with said first fluid filled tank attached to a first end of said first movement piston and said second end of said first movement piston connected to said vertical support member;

with said second fluid filled tank attached to a first end of said second movement piston and said second end of said second movement piston connected to said vertical support member at a position to exert force in a direction opposite to the force exerted by said first movement piston;

with each of said first and second movement pistons comprising a cylindrical body housing a central rod, with said central rod configured to move in one direction in said piston body, or an opposite direction in said piston body, based on the differential force exerted by the attached fluid filled tank or the opposing fluid filled tank;

with said pistons connecting said solar array to said vertical support member, so that a fluid filled tank exposed to solar heat by movement of the sun will cause movement of said pistons and movement of said solar array in a horizontal plane, in relation to said vertical support member which is stationary, until said fluid filled tanks have equal pressure which occurs when both of said fluid filled tanks are shaded by the sun and thus not contacted by the sun.

2. The solar panel positioning assembly of claim 1 in which said solar array comprises two solar panels on two frames, with the vertical support member between said panels, with said first and second fluid filled tanks on adjacent edges of said frames, with said solar panels positioned apart to define a separation space, with said solar panels each with an inner edge adjacent to said separation space.

3. The solar panel positioning assembly of claim 1 which comprises a single solar panel, with said first and second fluid filled tanks on opposite lateral sides of the periphery of said frame.

4. The solar panel positioning assembly of claim 1 which further comprises a third and fourth fluid filled tank positioned on near a top and bottom edges of said frame and configured so that said third and fourth fluid filled tanks are simultaneously shaded by said solar array when said solar array is normal to the sun, with each of said fluid filled tanks operationally connected to a third and fourth movement pistons;

a third and fourth piston each having a first and second end;

with said third fluid filled tank attached to a first end of said third piston and said second end of said third piston attached to said frame;

with said fourth fluid filled tank attached to a first end of said fourth piston and said second end of said fourth piston attached to said frame;

with each third and fourth piston comprising a cylindrical body housing a central rod, with said central rod configured to move in one direction in said piston body, or an opposite direction in said piston body, based on the differential pressure exerted by the fluid of the third and fourth fluid filled tank;

with said pistons connecting said solar array to said frame, so that a third or fourth fluid filled tank exposed to solar heat will cause movement of said pistons and movement of said solar array in a vertical plane, in relation to said vertical support member which is stationary, until said fluid filled tanks have equal pressure which occurs when both of said fluid filled tanks are shaded by said solar panels and not contacted by the sun, the four pistons thus providing horizontal movement and vertical movement of said solar array to position the solar array facing directly at the sun.

5. The solar panel positioning assembly of claim 4 which comprises two solar panels on two frames, with the vertical support member between said panels, with said first and second fluid filled tanks on adjacent edges of said frames, with said solar panels positioned apart to define a separation space, with said solar panels each with an inner edge adjacent to said separation space.

6. The solar panel positioning assembly of claim 4 which comprises a single solar panel, with said first and second fluid filled tanks on opposite lateral sides of the periphery of said frame and said third fluid filled tank on a side adjacent to said first fluid filled tank and said fourth fluid filled tank on a side of said periphery opposite said third fluid filled tank.

7. A solar panel positioning assembly comprising:

a vertical support member configured for support of a solar array;

a frame, having a central housing mount capable of attachment to said vertical support member, said frame having at least one cross-member rotatably attached to said central housing mount;

a solar array comprising at least one solar panel attached to said frame for collection of solar energy, with said solar panels having a periphery of four sides of each solar panel and said panels having a sun facing side and a shade facing side;

a first and a second fluid filled tank positioned on opposite sides of said periphery of said solar panels, on said shade facing side of said solar panels and configured so that said first and second fluid filled tanks are simultaneously shaded by said solar array when said solar array is normal to the sun, with each of said fluid filled tanks operationally connected to a first and second movement pistons;

with said first fluid filled tank attached to a first end of said first movement piston, and to a second end of said second movement piston;

with said second fluid filled tank attached to a first end of said second movement piston and a second end of said first movement piston;

with each piston comprising a cylindrical body housing a central rod with a separation disk attached to the approximate center of said central rod, with said central rod configured to move in one direction in said piston body, or an opposite direction in said piston body, based on the differential pressure exerted by the fluid of the first and second fluid fill tank;

with said pistons connecting said solar array to said vertical support member, so that a fluid filled tank exposed to solar heat will cause movement of said pistons and movement of said solar array in a horizontal plane, in relation to said vertical support member which is stationary, until said fluid filled tanks have equal pressure which occurs when both of said fluid filled tanks are not contacted by the sun.

8. The solar panel positioning assembly of claim 7 which comprises a solar array with two solar panels on two frames, with the vertical support member between said panels, with said first and second fluid filled tanks on adjacent edges of said frames, with said solar panels positioned apart to define a separation space, with said solar panels each with an inner edge adjacent to said separation space.

9. The solar panel positioning assembly of claim 7 which comprises a solar array of a single solar panel, with said first and second fluid filled tanks on opposite lateral sides of the periphery of said frame.

10. The solar panel positioning assembly of claim 7 which further comprises a third and fourth fluid filled tank positioned on a top and bottom edges of said frame, on an underside of said solar panels and configured so that said third and fourth fluid filled tanks are simultaneously shaded by said solar array when said solar array is normal to the sun, with each of said fluid filled tanks operationally connected to a third and fourth movement pistons;
   with said third fluid filled tank attached to a first end of said third piston, and to a second end of said fourth piston;
   with said fourth fluid filled tank attached to a first end of said fourth piston, and to a first end of said third piston;
   with each third and fourth piston comprising a cylindrical body housing a central rod with a separation disk attached to the approximate center of said central rod, with said central rod configured to move in one direction in said piston body, or an opposite direction in said piston body, based on the differential pressure exerted by the fluid of the first and second fluid filled tank;
   with said pistons connecting said solar array to said vertical support member, so that a third or fourth fluid filled tank exposed to solar heat will cause movement of said pistons and movement of said solar array in a vertical plane, in relation to said vertical support member which is stationary, until said fluid filled tanks have equal pressure which occurs when both of said fluid filled tanks are not contacted by the sun, thus providing horizontal movement and vertical movement of said solar array to position the solar array facing the sun.

11. The solar panel positioning assembly of claim 7 which comprises two solar panels on two frames, with said solar panels positioned apart to define a separation space, with said solar panels each with an inner edge adjacent to said separation space, with the vertical support member between said panels within said separation space, with said first and second fluid filled tanks on adjacent edges of said separation space.

12. The solar panel positioning assembly of claim 7 which comprises a single solar panel, with said first and second fluid filled tanks on opposite lateral sides of the periphery of said frame.

13. A solar panel positioning assembly comprising:
   a vertical support member configured for support of a solar array;
   a frame, having a central housing comprising a fixed housing configured to attach to said vertical support member and a rotating housing configured to rotatably attach to said fixed housing;
   at least one solar panel attached to said rotating housing for collection of solar energy, with said solar panels having a periphery of four sides of each solar panel;
   a first and a second fluid filled tank positioned on two sides of said periphery of said solar panels, on an underside of said solar panels and configured to so that said first and second fluid fill tanks are simultaneously shaded by said solar array when said solar array is normal to the sun, with said first fluid filled tank operationally connected to a first movement piston and said second fluid filled tank operationally connected to a second movement piston;
   with said first fluid filled tank attached to a first end of said first movement piston and said second end of said first movement piston connected to said vertical support member;
   with said second fluid filled tank attached to a first end of said second movement piston and said second end of said second movement piston connected to said vertical support member at a position to exert force in a direction opposite to the force exerted by said first movement piston;
   with each of said first and second movement pistons comprising a cylindrical body housing a central rod, with said central rod configured to move in one direction in said piston body, or an opposite direction in said piston body, based on the differential force exerted by the attached fluid filled tank or the opposing fluid filled tank;
   with said pistons connecting said solar array to said vertical support member, so that a fluid filled tank exposed to solar heat will cause movement of said pistons and movement of said solar array in a horizontal plane, in relation to said vertical support member which is stationary, until said fluid filled tanks have equal pressure.

14. The solar panel positioning assembly of claim 13 further comprising:
   A first vacuum tube solar collector attached to said first fluid filled tank, said first vacuum tube solar collector extending along the edge on which said first fluid filled tank is mounted, said vacuum tube solar collector configured to be shaded from the sun when said solar panels are normal to the sun;
   A second vacuum tube solar collector attached to said second fluid filled tank, said second vacuum tube solar collector extending along the edge on which said second fluid filled tank is mounted, said vacuum tube solar collector configured to be shaded from the sun when said solar panels are normal to the sun.

* * * * *